(12) United States Patent
Kinjo

(10) Patent No.: US 12,379,277 B2
(45) Date of Patent: Aug. 5, 2025

(54) METHOD OF CALIBRATING PRESSURE SENSOR WITH MAGNET

(71) Applicant: Japan Display Inc., Tokyo (JP)

(72) Inventor: Hiroumi Kinjo, Tokyo (JP)

(73) Assignee: Japan Display Inc., Tokyo (JP)

( * ) Notice: Subject to any disclaimer, the term of this patent is extended or adjusted under 35 U.S.C. 154(b) by 297 days.

(21) Appl. No.: 18/068,967

(22) Filed: Dec. 20, 2022

(65) Prior Publication Data

US 2023/0194374 A1    Jun. 22, 2023

(30) Foreign Application Priority Data

Dec. 21, 2021 (JP) .................. 2021-207115

(51) Int. Cl.
*G01L 27/00* (2006.01)
*G01L 9/14* (2006.01)

(52) U.S. Cl.
CPC .............. *G01L 27/005* (2013.01); *G01L 9/14* (2013.01); *G01L 27/007* (2013.01)

(58) Field of Classification Search
CPC . G01L 5/0066; G01L 27/007; G06F 3/04186; G06F 3/0418
See application file for complete search history.

(56) References Cited

U.S. PATENT DOCUMENTS

| | | | | |
|---|---|---|---|---|
| 4,866,383 A | * | 9/1989 | Taliaferro | G01V 3/08 73/763 |
| 5,036,286 A | * | 7/1991 | Holm-Kennedy | G01R 33/038 324/661 |
| 5,357,786 A | * | 10/1994 | Lung | G01N 3/42 73/81 |
| 5,532,589 A | * | 7/1996 | Gammell | G01N 27/825 73/86 |
| 6,169,481 B1 | * | 1/2001 | Goldberg | G08B 13/2442 340/676 |
| 6,505,522 B1 | * | 1/2003 | Wilssens | A61B 5/1036 73/862.51 |
| 7,158,122 B2 | * | 1/2007 | Roberts | G06F 3/0418 345/173 |
| 7,421,903 B2 | * | 9/2008 | Brosh | G01L 27/005 73/722 |
| 7,995,240 B2 | * | 8/2011 | Ikeno | G03G 15/0173 358/1.9 |

(Continued)

FOREIGN PATENT DOCUMENTS

| | | |
|---|---|---|
| JP | H09-079931 A | 3/1997 |
| JP | 2004-279351 A | 10/2004 |
| JP | 2015-040776 A | 3/2015 |

*Primary Examiner* — Tran M. Tran

(74) *Attorney, Agent, or Firm* — K&L Gates LLP

(57) ABSTRACT

According to one embodiment, a calibration method includes placing a pressure sensor on a base material having magnetic properties, placing a magnet on the pressure sensor, attracting the magnet to the base material while interposing the pressure sensor therebetween and applying a predetermined pressing force onto the pressure sensor, detecting a sensor output of a pressure-sensitive portion pressed by the magnet, estimating the deterioration of the pressure sensor by comparing the sensor output with a specified value corresponding to characteristics of the magnet, generating correction data to calibrate the degradation and inputting the generated correction data to the pressure sensor.

15 Claims, 8 Drawing Sheets

(56) References Cited

U.S. PATENT DOCUMENTS

| | | | | |
|---|---|---|---|---|
| 8,587,527 | B2* | 11/2013 | Yamamoto | G06F 3/045 |
| | | | | 345/173 |
| 8,590,386 | B2* | 11/2013 | Takeuchi | G01R 33/072 |
| | | | | 73/728 |
| 9,366,610 | B2* | 6/2016 | Zhang | G01N 3/42 |
| 9,459,738 | B2* | 10/2016 | Lin | G06F 3/0418 |
| 9,588,599 | B2* | 3/2017 | Fullerton | A63F 13/21 |
| 9,632,645 | B2* | 4/2017 | Nam | G06F 3/046 |
| 9,766,142 | B1* | 9/2017 | Hague | G01L 1/122 |
| 9,785,272 | B1* | 10/2017 | Rosenberg | G06F 3/041661 |
| 9,857,245 | B2* | 1/2018 | Onal | G01L 1/122 |
| 10,048,801 | B2* | 8/2018 | Wang | G06F 3/0412 |
| 10,871,846 | B2* | 12/2020 | Nishimura | G06F 3/0445 |
| 11,176,875 | B2* | 11/2021 | Sohn | G09G 3/32 |
| 11,668,554 | B2* | 6/2023 | Shen | G01L 1/12 |
| | | | | 324/207.2 |
| 11,717,142 | B2* | 8/2023 | Sitti | G01C 25/00 |
| | | | | 600/118 |
| 11,797,043 | B2* | 10/2023 | Close | G05G 9/047 |
| 11,846,693 | B2* | 12/2023 | Shibuya | G01R 33/098 |
| 11,982,583 | B2* | 5/2024 | Tomo | G01L 1/12 |
| 12,038,488 | B2* | 7/2024 | Tsuji | G01R 33/091 |
| 12,042,902 | B2* | 7/2024 | Zhang | G01L 5/0076 |
| 2012/0280934 | A1* | 11/2012 | Ha | G06F 11/2221 |
| | | | | 901/14 |
| 2015/0192440 | A1* | 7/2015 | Chow | G01D 18/006 |
| | | | | 73/1.01 |
| 2022/0412791 | A1* | 12/2022 | Close | G01L 5/169 |

* cited by examiner

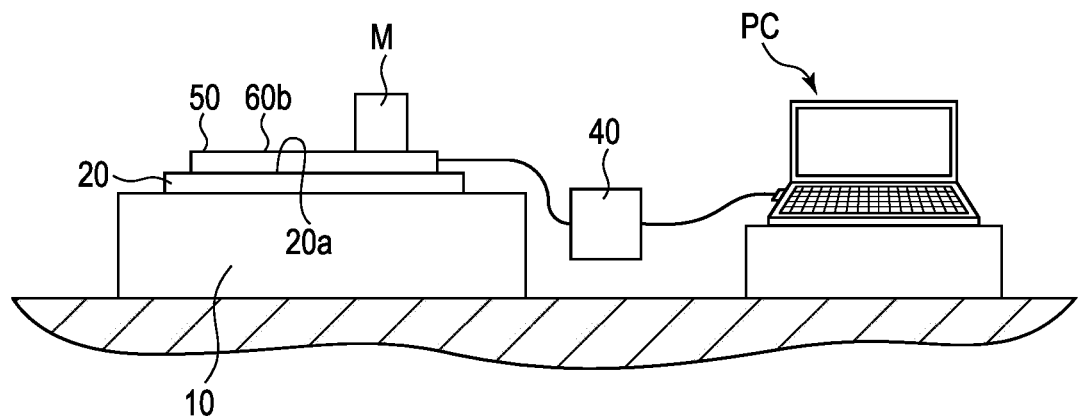
F I G. 1
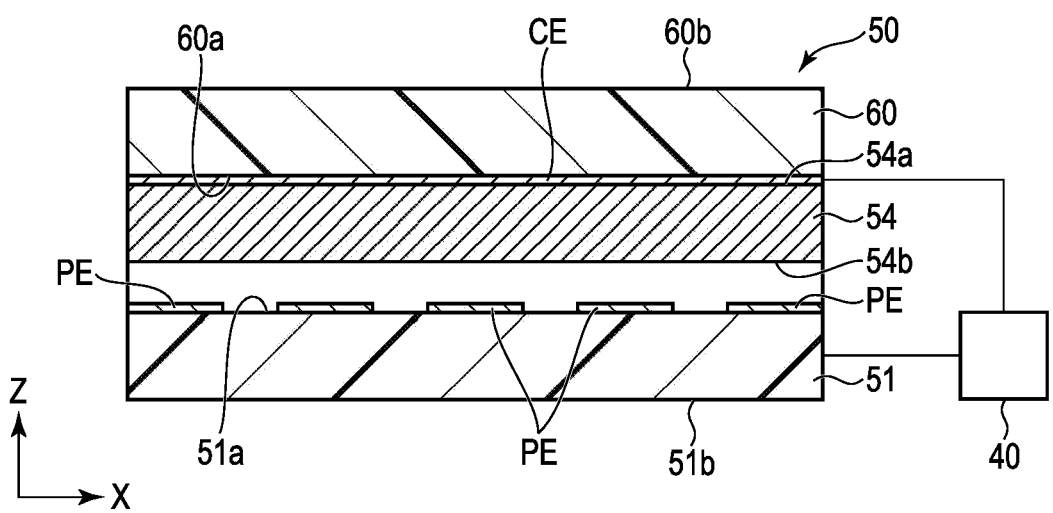
F I G. 2

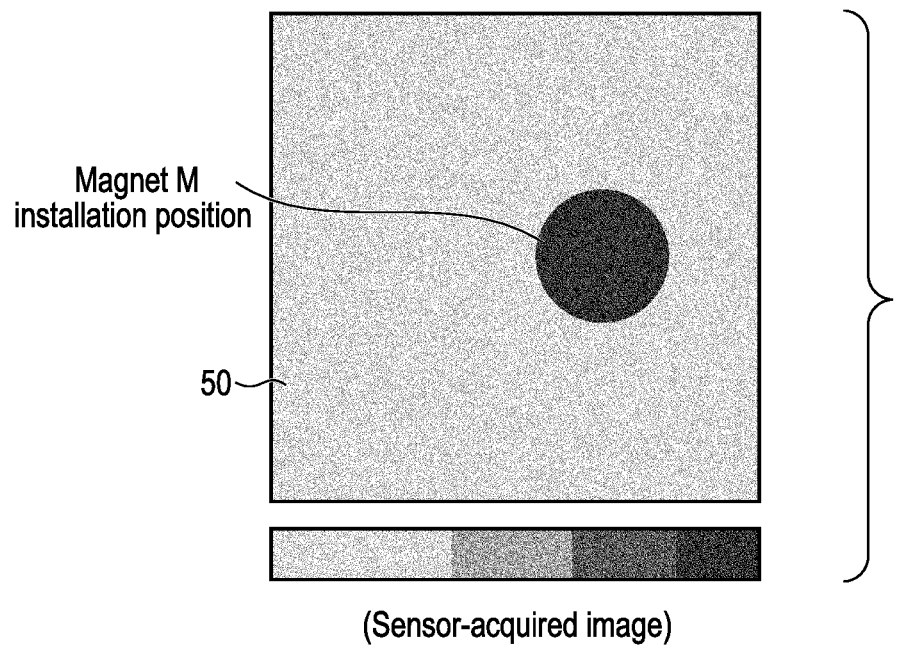
(Sensor-acquired image)
F I G. 8
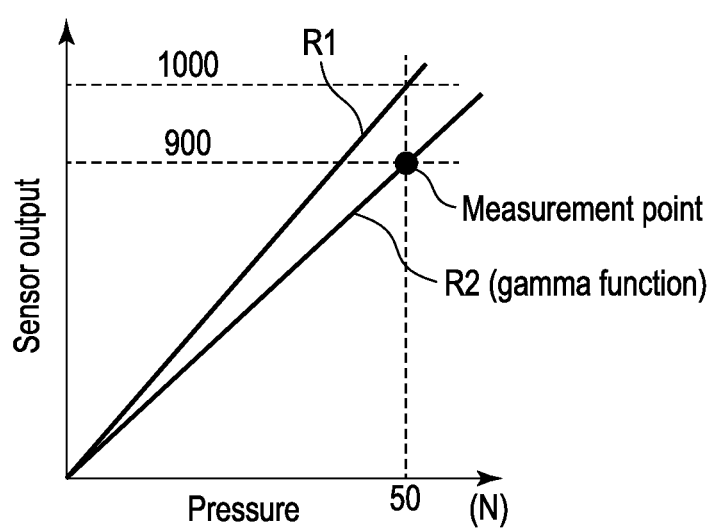
F I G. 9

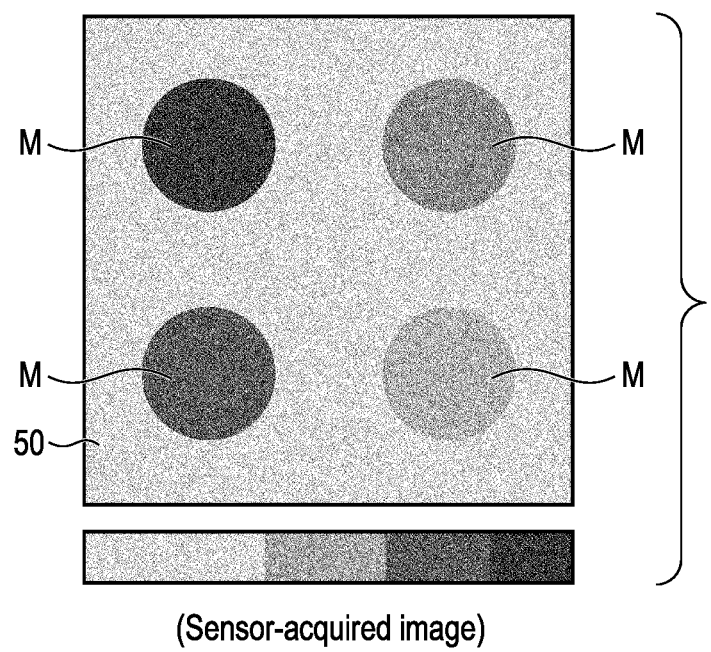
(Sensor-acquired image)
F I G. 10
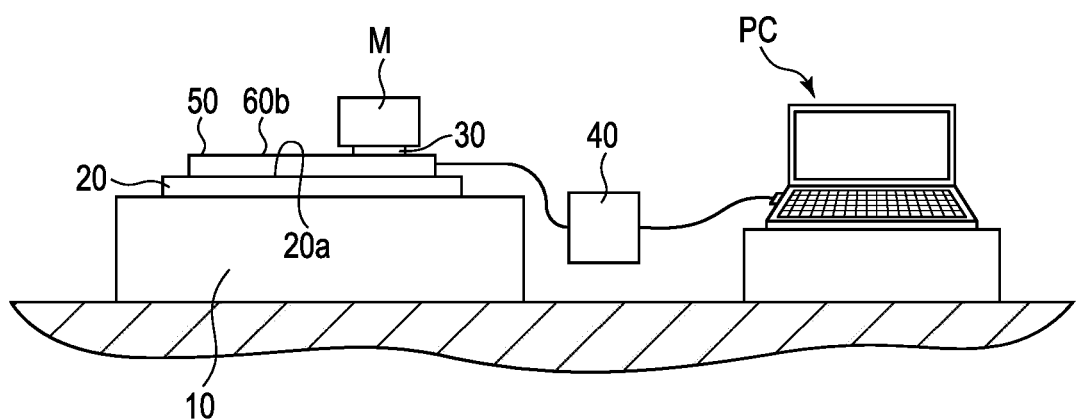
F I G. 11

METHOD OF CALIBRATING PRESSURE SENSOR WITH MAGNET

CROSS-REFERENCE TO RELATED APPLICATIONS

This application is based upon and claiming the benefit of priority from Japanese Patent Application No. 2021-207115, filed Dec. 21, 2021, the entire contents of which are incorporated herein by reference.

FIELD

Embodiments described herein relate generally to a method of calibrating a pressure sensor.

BACKGROUND

Sheet-shaped pressure distribution sensors configured such that a thin-film transistor (TFT) and a pressure-sensitive layer are mounted on an insulating base layer, have been proposed. In such pressure distribution sensors, organic materials are used for the sensor material, the surrounding base material and the protective film. Consequently, the pressure sensitivity of the pressure distribution sensor may vary over time or due to environmental factors. Under these circumstances, it is necessary to measure the degree of deterioration of the pressure distribution sensor and carry out calibration at an appropriate time. However, the conventional calibration devices and methods require a large-scale pressing mechanism and pressing device, making it difficult to achieve low cost, stability and simplicity at once.

BRIEF DESCRIPTION OF THE DRAWINGS

FIG. 1 is a diagram schematically showing a calibration system according to a first embodiment.

FIG. 2 is a cross-sectional view of an example of a pressure distribution sensor to be calibrated.

FIG. 8 is a diagram schematically showing a sensor-acquired image acquired by the pressure distribution sensor.

FIG. 9 is a diagram showing a comparison between a gamma function according to the specified value and a gamma function corrected according to the sensor output.

FIG. 10 is a diagram showing a sensor pressure distribution image acquired by a calibration method according to a second embodiment.

FIG. 11 is a diagram schematically showing a calibration system according to a third embodiment.

DETAILED DESCRIPTION

Figure 3:
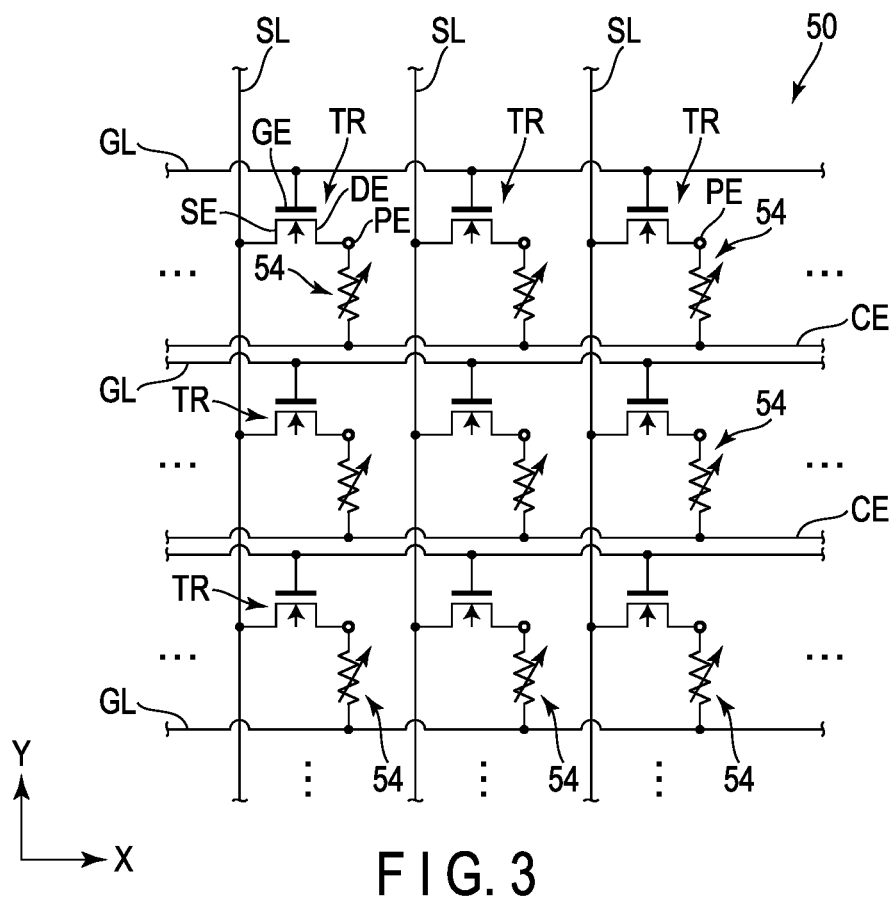
FIG. 3 is a plan view schematically showing a circuit configuration of the pressure distribution sensor.

Various embodiments will be described hereinafter with reference to the accompanying drawings. In general, according to one embodiment, a calibration method of calibrating degradation of a pressure sensor including a plurality of pressure-sensitive portions arranged in a matrix, comprises placing the pressure sensor on a base material having magnetic properties, placing a magnet on the pressure sensor, attracting the magnet to the base material while interposing the pressure sensor therebetween and applying a predetermined pressing force onto the pressure sensor, detecting a sensor output of a pressure-sensitive portion pressed by the magnet, estimating the deterioration of the pressure sensor by comparing the sensor output with a specified value corresponding to characteristics of the magnet, generating correction data to calibrate the degradation and inputting the generated correction data to the pressure sensor.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

A calibration system and a calibration method according to a first embodiment will be described.

FIG. 1 is a diagram schematically showing the calibration system of the first embodiment.

As shown in FIG. 1, the calibration system comprises a base plate (substrate) 20 on which a sheet-shaped pressure distribution sensor 50 to be calibrated is placed, a magnet M placed on the pressure distribution sensor 50 and a computer PC which generates correction data based on measurement data. The computer PC is connected to a controller (control device) 40 of the pressure distribution sensor 50 in order to input generated correction data to the controller 40. The controller 40 calibrates a detection value of the pressure distribution sensor 50 to a desired proper value based on the correction data.

First, an example of the pressure distribution sensor to be calibrated will be described.

FIG. 2 is a partial cross-sectional view showing an example of the pressure distribution sensor, and FIG. 3 is a plan view schematically showing a circuit configuration of the pressure distribution sensor.

In the figures, a first direction X, a second direction Y and a third direction Z are three directions orthogonal to each other. In addition, it is assumed that there is an observation position to observe the pressure distribution sensor on a tip side of an arrow in the third direction Z, and viewing from this observation position toward the X-Y plane defined by the first direction X and the second direction Y is referred to as a plan view.

As shown in FIG. 2, the sheet-shaped pressure distribution sensor 50 comprises an array substrate 51, a sensor layer (pressure-sensitive layer) 54 opposing the array substrate 51 with an interval therebetween, and a counter electrode CE and a protective layer 60, which are stacked in order on the sensor layer 54. The thickness of the pressure distribution sensor 50 in the stacking direction is set to about 10 to several hundred micrometers (μm). The pressure distribution sensor 50 includes the controller (control device) 40 connected to electrodes of the array substrate 51 and to the counter electrode CE, which will be described later. The controller 40 detects a pressure value of a pressure applied to the pressure distribution sensor 50 and a pressure position.

The array substrate 51 is a rectangular-shaped insulating substrate and includes a counter surface 51a opposing the sensor layer 54 and a lower surface 51b opposing the counter surface 51a. On the counter surface 51a, a plurality of array electrodes (pixel electrodes) PE are provided in a matrix arrangement. The lower surface 51b forms a second main surface of the pressure distribution sensor 50.

As shown in FIG. 3, the array substrate 51 comprises a plurality of scanning lines GL parallel to each other, a plurality of signal lines SL extending parallel to each other and orthogonal to the scanning lines GL and a plurality of transistors TR each provided in a vicinity of a respective intersection between of each scan line GL and a respective signal line SL, which are provided on the counter surface 51a. A gate electrodes GE of each transistor TR is connected to a respective one of the scanning lines GL, and a source electrode SE of each transistor TR is connected to a respective one of the signal lines SL. A drain electrode DE of the transistor TR is connected to an array electrode PE. Between the array electrode PE and the counter electrode CE, the sensor layer 54 is disposed.

As shown in FIG. 2, the sensor layer 54 is a sheet member formed into the same shape as that of the array substrate 51 in plan view. The sensor layer 54 includes a first surface 54a and a second surface 54b located on an opposite side to the first surface 54a while opposing. The sensor layer 54 is formed of a pressure-sensitive material whose resistance value varies when pressure is applied thereto, that is, for example, a pressure-sensitive conductive elastomer formed by dispersing conductive microparticles in a highly insulating rubber material. In the sensor layer 54, the conductive microparticles disposed in the base material are separated from each other. The base material of the sensor layer 54 is made of rubber with low stiffness. With this structure, the sensor layer 54 under normal conditions (when not deformed) exhibits high resistance and has insulating properties in the thickness direction and in the plane direction. On the other hand, when the sensor layer 54 is pressed from above, the base material at the pressed point depresses toward the array substrate 51. As a result, conductive microparticles contained in the deformed base material are brought into contact with each other and the deformed base material becomes conductive in the thickness direction. As described above, the sensor layer 54 is formed of a pressure-sensitive material whose resistance value varies due to pressure applied from the thickness direction.

The first surface 54a of the sensor layer 54 opposes approximately parallel to the counter surface 51a of the array substrate 51 and the array electrode PE with a predetermined interval therebetween. The counter electrode CE is stacked on the second surface 54b of the sensor layer 54. The counter electrode CE is a solid electrode deposited on the entire surface of the second surface 54b and is formed into a rectangular shape having approximately the same size as that of the array substrate 51 in a planar view. To the counter electrode CE, a reference voltage is applied from the controller 40.

The protective layer 60 is a sheet material formed into the same shape as that of the array substrate 51 in planar view. The protective layer 60 is formed of rubber or resin with high insulation properties and low rigidity. The protective layer 60 is stacked on the counter electrode CE. The protective layer 60 includes a first surface 60a attached to the counter electrode CE and a second surface 60b on an opposite side. The second surface 60b of the protective layer 60 is equivalent to the first main surface of the pressure distribution sensor 50 and forms a pressure-receiving surface that receives pressure. The counter electrode CE and the protective layer 60 have approximately the same degree of rigidity as that of the sensor layer 54, so that only the portion pressed by a finger or the like is depressed. Note that the counter electrode CE may be formed on the first surface 60a of the protective layer 60, and in this case, the entirety of the first surface 60a of the protective layer 60 and the counter electrode CE is attached to the first surface 54a of the sensor layer 54.

The controller 40 comprises a gate driver (not shown) connected to the scanning lines GL and a source driver (not shown) connected to the signal lines SL, so as to select the array electrodes PE sequentially. The controller 40 measures the value of the current which flows to an array electrode PE and, based on the measured current value, estimates the position (coordinates) in the sensor layer 54, which is deformed by pressing and the pressing force (pressure value) thereof.

Next, an example of operation of the pressure distribution sensor 50 will be described.

Figure 4:
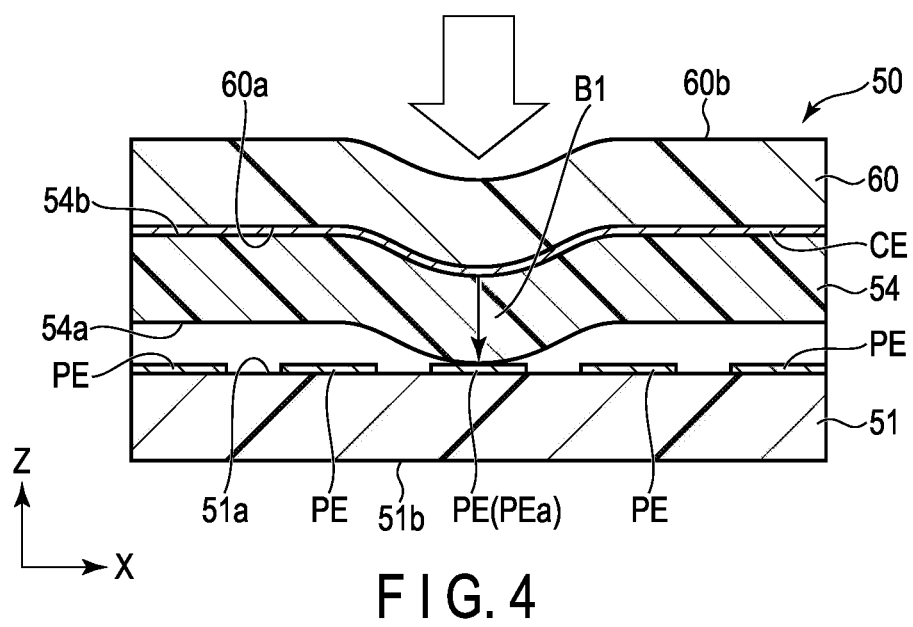
FIG. 4 is a cross-sectional view schematically showing the pressure distribution sensor when pressed.

FIG. 4 is a cross-sectional view of the pressure distribution sensor 50 in the state the first main surface (second surface 60b) is being pressed. When the second surface 60b of the protective layer 60 is not pressed, the thickness of the sensor layer 54 is not reduced at any point. As a result, the sensor layer 54 exhibits insulating properties in the thickness direction and thus no current (signal) flows from the counter electrode CE to the sensor layer 54. On the other hand, as shown in FIG. 4, when the second surface 60b of the protective layer 60 is pressed in the thickness direction, the protective layer 60, the counter electrode CE and the sensor layer 54 are depressed in the pressing direction (stacking direction). As a result, the first surface 54a of the sensor layer 54 is brought into contact with the corresponding array electrode PE (PEa) at the pressing point, and the resistance value becomes low in a deformed portion B1 of the sensor layer 54 thus depressed. Therefore, the current flows from the counter electrode CE through the deformed portion B1 of the sensor layer 54 to the array electrode PE (PEa).

The controller 40 detects that a signal (current) is input to the array electrode PEa and calculates out the position (coordinates) of the pressed point and the pressure value thereof.

As described above, in this example of the pressure distribution sensor 50, each of the array electrodes PE, together with the sensor layer 54, constitutes a pressure-sensitive portion through which the current flows in response to the pressing force. As shown in FIG. 3, a plurality of pressure-sensitive portions (array electrodes PE) are disposed in the array of a matrix in the first direction X and the second direction Y over substantially the entire active area of the pressure distribution sensor 50.

As shown in FIG. 1, the base plate 20 is installed, for example, on the base 10. The base plate 20 is formed of a magnetic material, for example, magnetic metal or magnet, to which the magnet M can be attracted. The base plate 20 includes a flat installation surface 20a which is formed to have an area larger than that of the pressure distribution sensor 50.

The pressure distribution sensor 50 is placed on the installation surface 20a of the base plate 20. The pressure distribution sensor 50 is placed on the base plate 20 in such a manner, for example, that the second main surface 51b is brought into contact with the installation surface 20a.

Figure 5A:
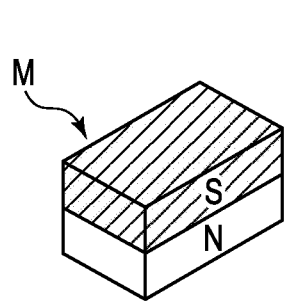
FIG. 5A is a perspective view of a magnet used in the calibration system.
Figure 5B:
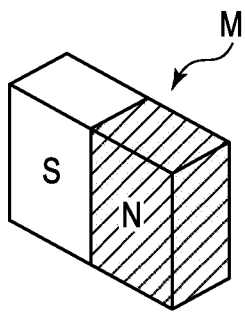
FIG. 5B is a perspective view of a magnet used in the calibration system.
Figure 5C:
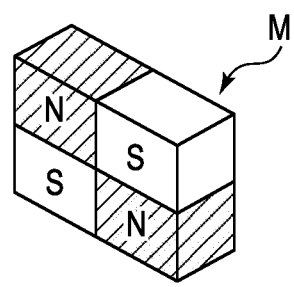
FIG. 5C is a perspective view of a magnet used in the calibration system.

Although the material of the magnet M is not particularly specified, the magnet M can be appropriately formed of a neodymium magnet, for example, to reduce the size of the calibration system. The shape and single/multipole polarity of the magnet M can be freely selected. As shown in FIGS. 5A and 5B, for example, the magnet M is a single-pole magnet with a square prismatic shape and is arranged in a horizontal or vertical orientation. As shown in FIG. 5C, the magnet M can be a multi-pole magnet in the shape of a square prism. The shape of the magnet M is not limited to prismatic, but may as well be cylindrical or other shapes.

Figure 6A:
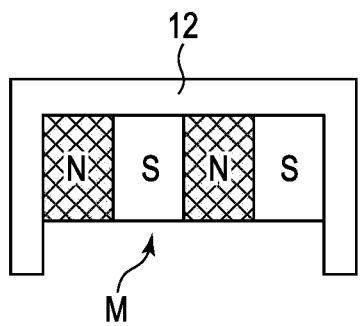
FIG. 6A is a diagram schematically showing a magnet with a yoke used in the calibration system.
Figure 6B:
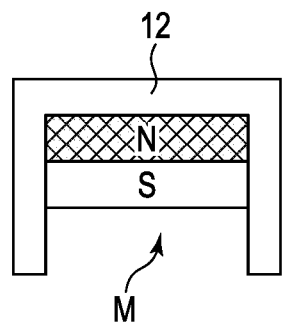
FIG. 6B is a diagram schematically showing a magnet with a yoke used in the calibration system.
Figure 6C:
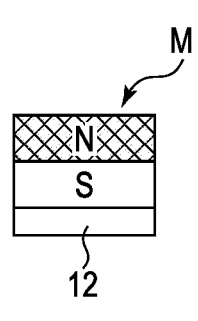
FIG. 6C is a diagram schematically showing a magnet with a yoke used in the calibration system.

As shown in FIGS. 6A, 6B and 6C, the magnet M may be configured to include a yoke 12 provided therewith.

Figure 7:
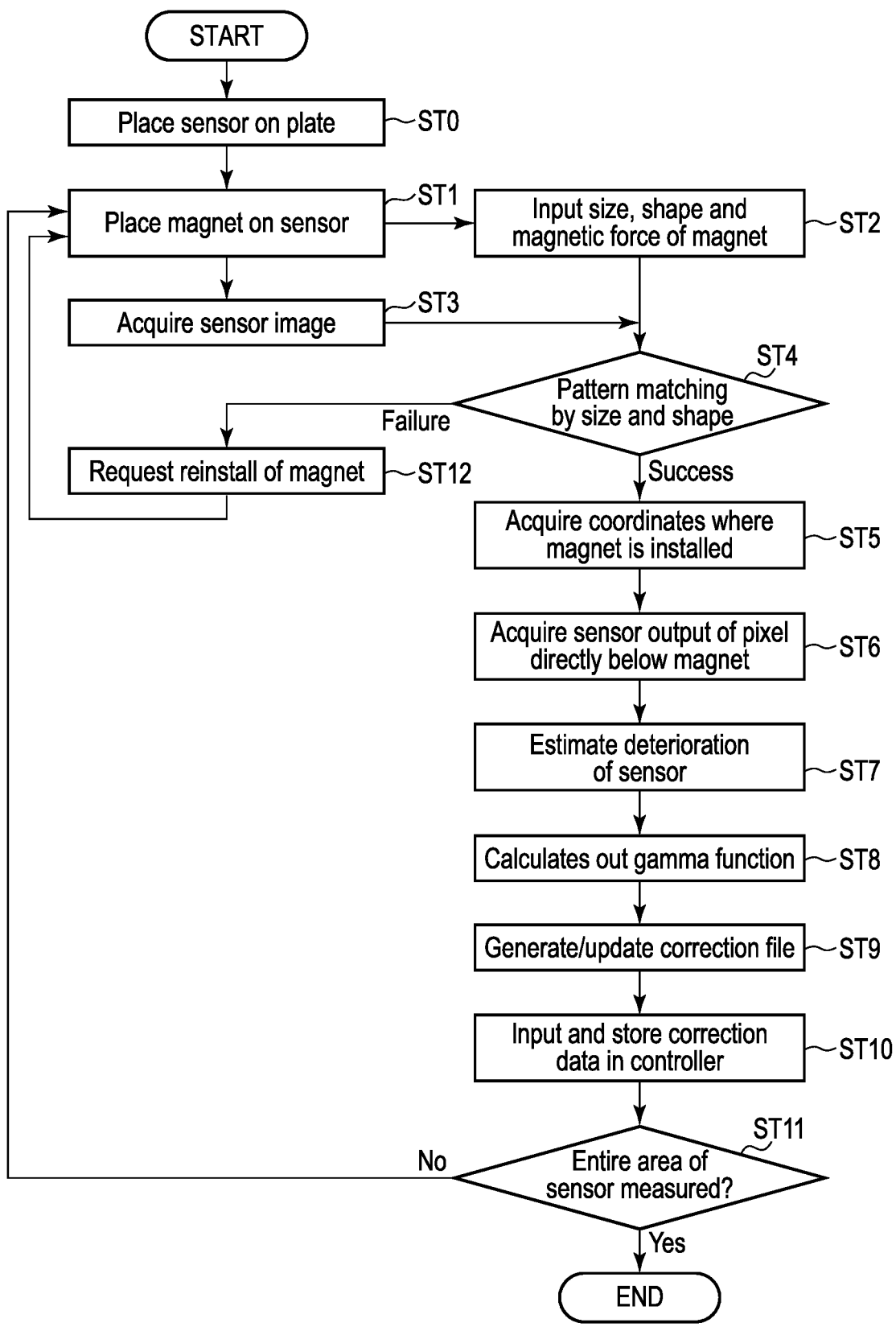
FIG. 7 is a flowchart showing a calibration process in the calibration system.

Next, a method of measuring and calibrating the deterioration of the pressure distribution sensor 50 by the calibration system described above will now be described. FIG. 7 is a flowchart showing the process of the calibration method.

As shown in FIG. 7, the sheet-shaped pressure distribution sensor 50 is placed on the installation surface 20a of the base plate 20 (ST0), and thereafter, the magnet M is placed on the pressure distribution sensor 50 at an arbitrary position (ST1). Before or after placing the magnet M, various characteristics of the magnet M, such as size, shape and magnetic force (attraction force) are input to the computer PC (ST2).

The magnet M thus placed is attracted on the base plate 20 while interposing the pressure distribution sensor 50 therebetween and a predetermined pressing force is applied to the pressure distribution sensor 50. The pressure distribution sensor 50 is configured to display the pressure value (measured value) of the applied pressure as a sensor output when the object to be measured is placed on the sensor.

When pressed by the magnet M, electric current flows to those of the array electrodes PE of the pressure distribution sensor 50, to which the pressure force is applied. The controller 40 measures the value of the current that flows to the array electrodes PE and detects the pressing force (pressure value) and the position (coordinates) of the pressed point based on the measured current value. The controller 40 acquires a sensor image (pressure distribution image) as shown in FIG. 8 based on the detected pressure value and coordinates (ST3). The controller 40 sends the acquired sensor image to the computer PC.

The computer PC carries out pattern matching between the input magnet information and the image acquired by the sensor (ST4) to: 1) estimate at which location on the first main surface (pressure surface) 60a of the pressure distribution sensor 50 and in which orientation the magnet M is installed (acquire the coordinates of the position where the magnet M is installed) (ST5); and 2) acquire the sensor outputs of the magnet M and the array electrode directly below based on the acquired coordinates (ST6). Further, the computer PC estimates the degree of deterioration of the pressure distribution sensor 50 by comparing the acquired sensor output with the specified value or the previous measurement value assumed from the magnet information (ST7). The magnetic force (attraction force) of the magnet M does not fluctuate very much due to the environment or over time. Therefore, if the acquired sensor output value is different from the specified value or the previous measurement value, it can be estimated that the sensor has deteriorated.

When the sensor output is lower than the specified value or the previous measurement value, the computer PC estimates that the pressure distribution sensor 50 has deteriorated. Further, the computer PC calculates out a gamma function corresponding to the degree of degradation (ST8), and generates or update a correction file (correction data) based on the gamma function calculated (ST9). The generated or updated correction data is sent to the controller 40 of the pressure distribution sensor 50 and stored in the controller 40 (ST10).

Note that if the pattern matching fails in step ST4, the computer PC displays or notifies the operator of a request to reinstall the magnet M (ST12).

The computer PC estimates whether or not the effective area of the pressure distribution sensor 50 has been measured (ST11), and when it has not measured within the effective area, the position of installation of the magnet M is changed and then the steps ST3 to ST10 are executed repeatedly. When the measurement within the effective area and the generation of the correction data are completed, the process is terminated. In the measurement of the pressure distribution sensor 50, the entire effective area may be measured, or one or multiple locations within the effective area may be measured, to estimate, from the measurement results, the tendency of the pressure distribution sensor 50 over the entire effective area.

In the pressure distribution sensor 50 subjected to the calibration process, the controller 40 calibrates the detected pressure values based on the correction data, that is, based on the corrected gamma function, and outputs or displays the result.

In the calibration method described above, any of the steps or processes may be substituted by the operator. Further, the measurement and calibration of the pressure distribution sensor 50 may be performed whenever necessary or periodically over a predetermined period of time.

Examples will now be described.

In one example, with use of a cylinder-shaped magnet M having a diameter of 15 mm, a height of 8 mm and an attraction force (magnetic force) of 50 N, the measurement and correction/calibration of a pressure distribution sensor 50 with a rectangular active area of 50×50 mm are carried out. The magnet M placed on the pressure surface 60b of the pressure distribution sensor 50 is attracted to the base plate 20 while interposing the pressure distribution sensor 50 therebetween, and a pressure force of 50N is applied to the pressure distribution sensor 50. As shown in FIG. 9, it is supposed here, for convenience, that the sensor output of the pressure distribution sensor 50 with no load is zero, the sensor output at an applied pressure of 50N is 1,000, and the sensor output between 0 and 50 N of applied pressure has a gamma function R1 which is linear. The pressure distribution sensor 50 is configured to display the pressure value corresponding to the sensor output when the object to be measured is placed on the sensor.

The computer PC carries out image processing such as template matching on the sensor image (pressure distribution image) acquired by the pressure distribution sensor 50 based on the size and magnetic force of the magnet M, to obtain the position coordinates where the magnet M is installed. Further, the computer PC acquires the sensor output of a pixel (array electrode) directly below where the magnet M is installed according to the position coordinates. For example, when the sensor output is 900, which is lower than the specified value of 1000, the computer PC estimates that the pressure distribution sensor 50 has deteriorated, and calculates out a new gamma function R2. The gamma function R2 may be set for each pixel, or the same gamma function may be set over the entire sensor effective area. In practice, it is assumed that the gamma function will not be a straight line. Therefore, it is preferable to apply multiple pressing forces to the pressure distribution sensor 50 and obtain an approximate curve of multiple measurement points as the gamma function.

According to the calibration system and method configured as described above, a desired pressing force can be applied to the pressure distribution sensor and a pressure distribution image of the pressure distribution sensor can be obtained simply by placing a magnet on the pressure distribution sensor. Since the magnetic force of the magnet does not vary so much due to the environment or over time, it is possible to estimate that the pressure distribution sensor has deteriorated if the numerical value or size of the sensor-acquired image differs from the specified value or the previous measurement value. Thus, the sensor output of the pressure distribution sensor can be corrected/calibrated based on various characteristics of the magnet.

As described above, with use of a magnet, it is possible to measure the degree of deterioration of pressure distribution sensors and correct/calibrate sensor outputs without using a large-scale pressure mechanism or pressure device. Thus, a calibration system and a calibration method for pressure sensors, which can achieve all of low-cost, stability and simplicity can be obtained.

Next, calibration systems and calibration methods according to other embodiments and modified examples thereof will be described. In the other embodiments and modified examples to be described below, the same constituent parts as those of the first embodiment described above are denoted by the same reference symbols as those used in the first embodiment, and the detailed descriptions thereof may be omitted or simplified.

Second Embodiment

FIG. 10 is a diagram showing a sensor pressure distribution image obtained by a calibration method for a pressure sensor, according to a second embodiment.

As shown in the figure, in the calibration method of the second embodiment, a plurality of, for example, four magnets M are placed on the pressure distribution sensor 50 and in this state, the sensor output is measured and calibrated. The order, position and size of each of the magnets M placed on the pressure distribution sensor 50 are input to the computer PC, and are associated with the pressure distribution images of the respective magnets M. In this manner, it is possible to measure and calibrate (change the gamma function) multiple, in this case, four locations at the same time. Furthermore, based on the distribution of deterioration, locations where the magnets M are not installed can be calibrated as well. Moreover, by obtaining the average output of the entire surface of the pressure distribution sensor 50, the output of each pixel, and the size (diameter) of each measured magnet M, the sensor characteristics, sensor resolution and the like can be calibrated as well.

By setting an ID or other identification information for each of the multiple magnets M, it is possible to easily input multiple magnet information into the computer PC. When the size and attraction force can be matched one-to-one with the magnets, it is further possible to automatically carry out the estimation (pattern matching) from the results of measurement of the sensor outputs and the information on the magnets. When a plurality of magnets are used, it is possible to estimate (pattern matching) the sensor output and magnet information according to the order and position of installation of the magnets.

Third Embodiment

FIG. 11 is a diagram schematically showing a calibration system according to a third embodiment.

As shown in the figure, the third embodiment is configured such that a spacer 30 is placed between the pressure distribution sensor 50 and the magnet M. For the spacer 30, a magnetic material such as iron, a non-magnetic material such as SUS or plastic, or a composite/stacked body of any of these can be used. The spacer 30 is formed into, for example, a flat plate and to have arbitrary dimensions (area) and an arbitrary thickness.

By interposing the spacer 30 between the pressure distribution sensor 50 and the magnet M, the pressing force (pressure) applied from the magnet M to the pressure distribution sensor 50 or the attraction force pressure of the magnet M varies.

Figure 12A:
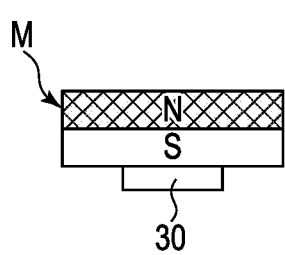
FIG. 12A is a diagram showing an example of a magnet and a spacer in the calibration system of the third embodiment.
Figure 12B:
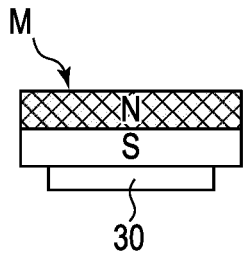
FIG. 12B is a diagram showing an example of a magnet and a spacer in the calibration system of the third embodiment.

As shown in FIGS. 12A and 12B, in the case where the thicknesses of the spacers 30 are the same as each other, the pressing force (pressure) applied to the pressure distribution sensor 50 can be adjusted by changing the area of the spacer 30. More specifically, as the dimensions (area) of the spacer 30 is smaller, the pressing force further increases.

Figure 12C:
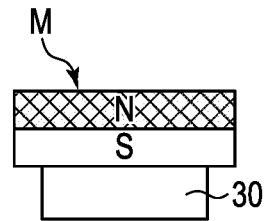
FIG. 12C is a diagram showing an example of a magnet and a spacer in the calibration system of the third embodiment.

Alternatively, as shown in FIGS. 12B and 12C, in the case where the areas of the spacers 30 are the same as each other, the attraction force applied to the pressure distribution sensor 50 can be adjusted by changing the thickness of the spacer 30. More specifically, as the thickness of the spacer 30 is greater, the attraction force reduces.

Figure 13:
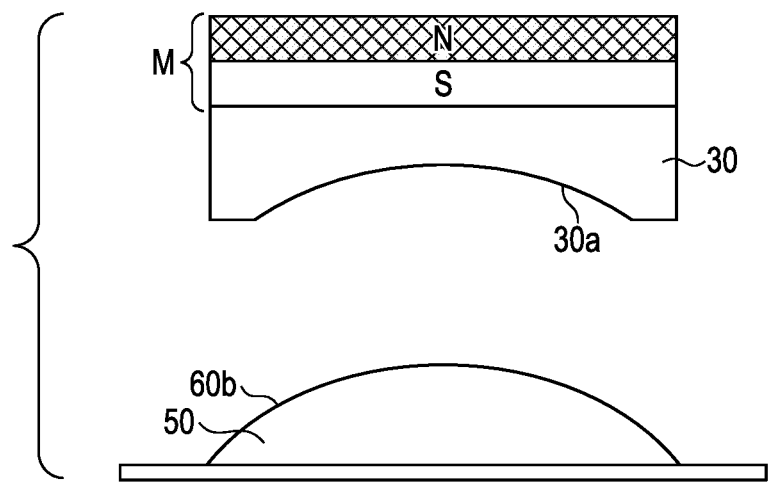
FIG. 13 shows another example of a magnet and a spacer in the calibration system of the third embodiment.

Note that the spacer 30 and the magnet M itself need not be flat, but can be made to accommodate a free-form curved surface. As shown in FIG. 13, when the pressed surface 60b of the pressure distribution sensor 50 is curved, the contact surface (lower surface) 30a of the spacer 30 can be a curved surface corresponding to the pressed surface 60b.

Figure 14:
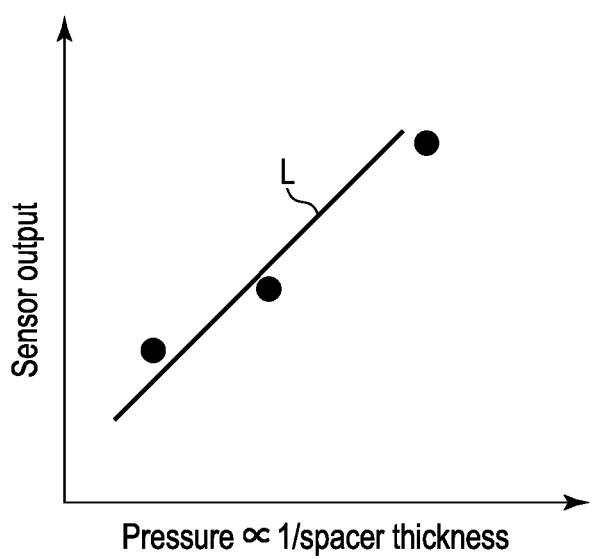
FIG. 14 is a diagram showing a relationship between the sensor output and a spacer size/spacer thickness.

By interposing the spacer 30 as described above, the pressing force or attraction force of the magnet M applied to the pressure distribution sensor 50 can be varied. In this manner, the change in the sensor output corresponding to the variation in the pressing pressure or attraction force can be measured, and thus a calibration curve L of the sensor output according to the pressure as shown in FIG. 14 can be obtained. When calibrating the pressure distribution sensor 50, the computer PC calculates out a reference value of the sensor output according to the pressure from the calibration curve L and compares the measured sensor output with this reference value. In this manner, it is possible to accurately estimate the degree of deterioration of the pressure distribution sensor 50.

As described above, according to the third embodiment, the pressing force or attraction force of the magnet M applied to the pressure distribution sensor 50 can be varied by the interposed spacer 30, without changing the magnet M itself, and thus the reference value of the sensor output according to the pressure fluctuation can be obtained. Then, with use of the reference value thus obtained, the degree of deterioration of the pressure distribution sensor 50 can be accurately estimated and the deterioration of the pressure distribution sensor 50 can be calibrated more accurately.

Although not shown in the figures, a cushioning material such as a resin sheet may be placed between the magnet M and the pressure distribution sensor 50, or between the pressure distribution sensor 50 and the base plate 20. With use of such a cushioning material, it is possible to prevent the pressure distribution sensor 50 from being destroyed by the impact even if the magnet M or the like is accidentally dropped.

Note that in place of the magnet M, an electromagnet may as well be used. In the case of electromagnets, the attraction force can be set freely by varying the applied voltage, enabling more accurate and precise measurement of the calibration curve L described above. By applying a voltage such as of a sine wave to the electromagnet, the response performance and the like of the pressure distribution sensor can as well be evaluated.

In the aforementioned embodiments, the base plate 20 may be constituted by an electromagnet. When an electromagnet is used, the magnet M can be easily removed by reducing the magnetic force. Further, by changing the magnetic force of the electromagnet, the attraction force of the magnet M can be changed, thus enabling evaluation of the response performance of the pressure distribution sensor 50. Note that it is also possible to use electromagnets for both the base plate 20 and the magnet M.

The base plate 20 may be prepared as an independent component and installed on a rear surface of the pressure distribution sensor 50 when necessary, or it can be incorporated into the housing or support of the calibration system. In the case of installation as needed, it suffices if base plate is formed to have dimensions sufficiently larger than those of the magnet M to be used. When incorporated, the base plate should be formed to have dimensions larger than those of the active area of the pressure distribution sensor. Further, the base plate may be used in conjunction with the housing or other parts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calibration method of calibrating degradation of a sheet shaped pressure sensor including a plurality of pressure-sensitive portions arranged in a matrix, the method comprising:

placing the sheet shaped pressure sensor on a flat installation surface of a base material having magnetic properties;

placing a magnet with a surface portion resting directly on the sheet shaped pressure sensor, attracting the magnet to the base material while interposing the sheet shaped pressure sensor therebetween and applying a predetermined pressing force of the magnet resting on the sheet shaped pressure sensor;

generating, for each of the pressure-sensitive portions pressed by the magnet, a respective sensor output;

estimating a deterioration of the sheet shaped pressure sensor by comparing the sensor output of each of the pressure-sensitive portions with a specified value corresponding to characteristics of the magnet;

generating correction data to calibrate the deterioration; and inputting or updating the generated correction data to the sheet shaped pressure sensor.

2. The calibration method of claim 1, further comprising:

acquiring, by the sheet shaped pressure sensor, the respective sensor output of each of the pressure-sensitive portions to provide, at each pressed position the respective the pressing force as a pressure distribution image;

obtaining position coordinates where the magnet is placed; and detecting the sensor output of the pressure-sensitive portion located at the position coordinates.

3. The calibration method of claim 1, wherein
the correction data includes a gamma function.

4. The calibration method of claim 1, further comprising placing a spacer, having arbitrary dimensions and a thickness, between the magnet and the pressure sensor to adjust the pressing force to be applied to the pressure sensor.

5. The calibration method of claim 4, wherein
the dimensions of the spacer are changed to adjust the pressing force to be applied to the sheet shaped pressure sensor.

6. The calibration method of claim 4, wherein
the thickness of the spacer is changed to adjust the attraction force of the magnet to be applied to the sheet shaped pressure sensor.

7. The calibration method of claim 1, wherein
an electromagnet is used as the magnet, and a voltage applied to the electromagnet is changed to adjust the magnetic force to be applied to the sheet shaped pressure sensor.

8. The calibration method of claim 1, further comprising placing a cushioning material between the base material and the sheet shaped pressure sensor, or between the sheet shaped pressure sensor and the magnet, to adjust the pressing force to be applied from the magnet to the sheet shaped pressure sensor.

9. The calibration method of claim 1, wherein
a plurality of magnets are placed at a plurality of installation positions of the sheet shaped pressure sensor, respectively, and correction data at each installation position is generated according to the sensor output at each installation position.

10. The calibration method of claim 1, wherein
a plurality of magnets are placed at a plurality of installation positions of the sheet shaped pressure sensor, respectively, and correction data for an entire surface of the sheet shaped pressure sensor is generated according to an average of sensor outputs at the plurality of installation positions.

11. The calibration method of claim 1, further comprising subjecting various characteristics of the magnet with the sensor image to pattern matching to obtain position coordinates where the magnet is placed.

12. The calibration method of claim 1, wherein a computer calculates a gamma function.

13. The calibration method of claim 12, wherein the gamma function is linear.

14. The calibration method of claim 12, wherein the gamma function is not a straight line.

15. The calibration method of claim 12, wherein the gamma function is set for each pixel.

* * * * *